(12) United States Patent
Persson et al.

(10) Patent No.: US 7,814,066 B1
(45) Date of Patent: Oct. 12, 2010

(54) SYSTEM FOR BACKUP AND RECOVERY OF A PLURALITY OF HETEROGENEOUS DATABASES

(75) Inventors: Carl J. Persson, Olathe, KS (US); Sei Ng, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 394 days.

(21) Appl. No.: 11/948,670

(22) Filed: Nov. 30, 2007

(51) Int. Cl.
*G06F 17/30* (2006.01)
(52) U.S. Cl. ...................................... 707/674; 707/640
(58) Field of Classification Search .................. 707/1–5, 707/10, 100, 102, 200–204, 674
See application file for complete search history.

(56) References Cited

U.S. PATENT DOCUMENTS

| | | | |
|---|---|---|---|
| 6,453,325 B1 * | 9/2002 | Cabrera et al. .............. | 707/204 |
| 2003/0046313 A1 * | 3/2003 | Leung et al. ................ | 707/204 |
| 2004/0186844 A1 * | 9/2004 | Muhlestein ................. | 707/100 |
| 2005/0021524 A1 * | 1/2005 | Oliver ........................ | 707/100 |
| 2007/0022144 A1 * | 1/2007 | Chen .......................... | 707/204 |

* cited by examiner

*Primary Examiner*—Cam-Linh Nguyen

(57) ABSTRACT

A system for backup and recovery of a plurality of heterogeneous databases is disclosed. The system comprises a first computer system configured to comprise a plurality of heterogeneous databases and a second computer system configured to execute an application program. The second computer system is in operational relationship with the plurality heterogeneous databases. The application program is configured to issue a transaction statement that triggers a change in the plurality of heterogeneous databases. The system also comprises a third computer system configured to accumulate information from the transaction statement from the plurality of heterogeneous databases. The third computer system is further configured to recover the plurality of heterogeneous databases to a point in time based on the information from the transaction statement.

21 Claims, 2 Drawing Sheets

| | DB ID | Time Stamp | User Name | Native DB Commands | Data Manipulated | |
|---|---|---|---|---|---|---|
| 1 | 210 | 220 | 230 | 240 | 250 | — 205 |
| 2 | 210 | 220 | 230 | 240 | 250 | — 205 |
| ⋮ | | | | | | |
| n | 210 | 220 | 230 | 240 | 250 | — 205 |

SYSTEM FOR BACKUP AND RECOVERY OF A PLURALITY OF HETEROGENEOUS DATABASES

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Databases are used in various applications (e.g., employee records, financial accounts, digital video and digital images) to store large amounts of data. An application may access different types of databases (e.g. Oracle, DB2, and Sequel). In the event of a failure (La, power outage and database failure), each of the plurality of databases may use their own proprietary recovery tools.

SUMMARY

A method is provided for recovering a plurality of heterogeneous databases. The method comprises issuing a transaction statement that triggers a change in a plurality of heterogeneous databases. The method also comprises capturing information from the transaction statement issued to the plurality of heterogeneous databases. The method also comprises accumulating the information from the transaction statement issued to the plurality of heterogeneous databases. The method also comprises recovering the plurality of heterogeneous databases to a point in time based on the information from the transaction statement.

A system for backup and recovery of a plurality of heterogeneous databases is provided. The system comprises a first computer system configured to comprise a plurality of heterogeneous databases and a second computer system configured to execute an application program. The second computer system is in operational relationship with the plurality of heterogeneous databases. The application program is configured to issue a transaction statement that triggers a change in the plurality of heterogeneous databases. The system also comprises a third computer system configured to accumulate information from the transaction statement from the plurality of heterogeneous databases. The third computer system is further configured to recover the plurality of heterogeneous databases to a point in time based on the information from the transaction statement.

A computer-readable medium storing a program is provided. The program, when executed by a processor, causes the processor to capture information from a transaction statement issued to a plurality of heterogeneous databases, where the transaction statement is issued from an application program. The transaction statement triggers a change in the plurality of heterogeneous databases. The processor also sends the information from the transaction statement to a transaction accumulator in a sequence that the transaction statement triggers the change to the plurality of heterogeneous databases.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or later in existence. The disclosure should in no way be limited to the illustrative implementations, drawings, and techniques illustrated below, but may be modified within the scope of the appended claims along with their full scope of equivalents.

The various embodiments are directed to backup and recovery of a plurality of heterogeneous databases to a point in time. As previously discussed, in the event of a failure, the plurality of heterogeneous databases use their own proprietary tools, necessitating that each of the plurality of heterogeneous databases be individually recovered. Because the several databases may be interrelated, to the extent that the data stored may be interrelated, it may be desirable to recover the plurality of heterogeneous databases while maintaining data consistency across the several databases. The proprietary tools of the heterogeneous databases may not be designed to promote this data consistency among the several databases. A computer module is disclosed that works with the several heterogeneous databases to promote this data consistency. Thus, some of the embodiments comprise a computer system with a plurality of heterogeneous databases and agent programs in an operational relationship with the plurality of heterogeneous databases. The agent programs capture information from transaction statements issued to each of the heterogeneous databases, such as the transaction statements issued by an application program. A transaction accumulator receives the information from the transaction statements from the agent programs, and the transaction accumulator enables recovery of the plurality of heterogeneous databases to a point in time based on the information from the transaction statements.

Figure 1:
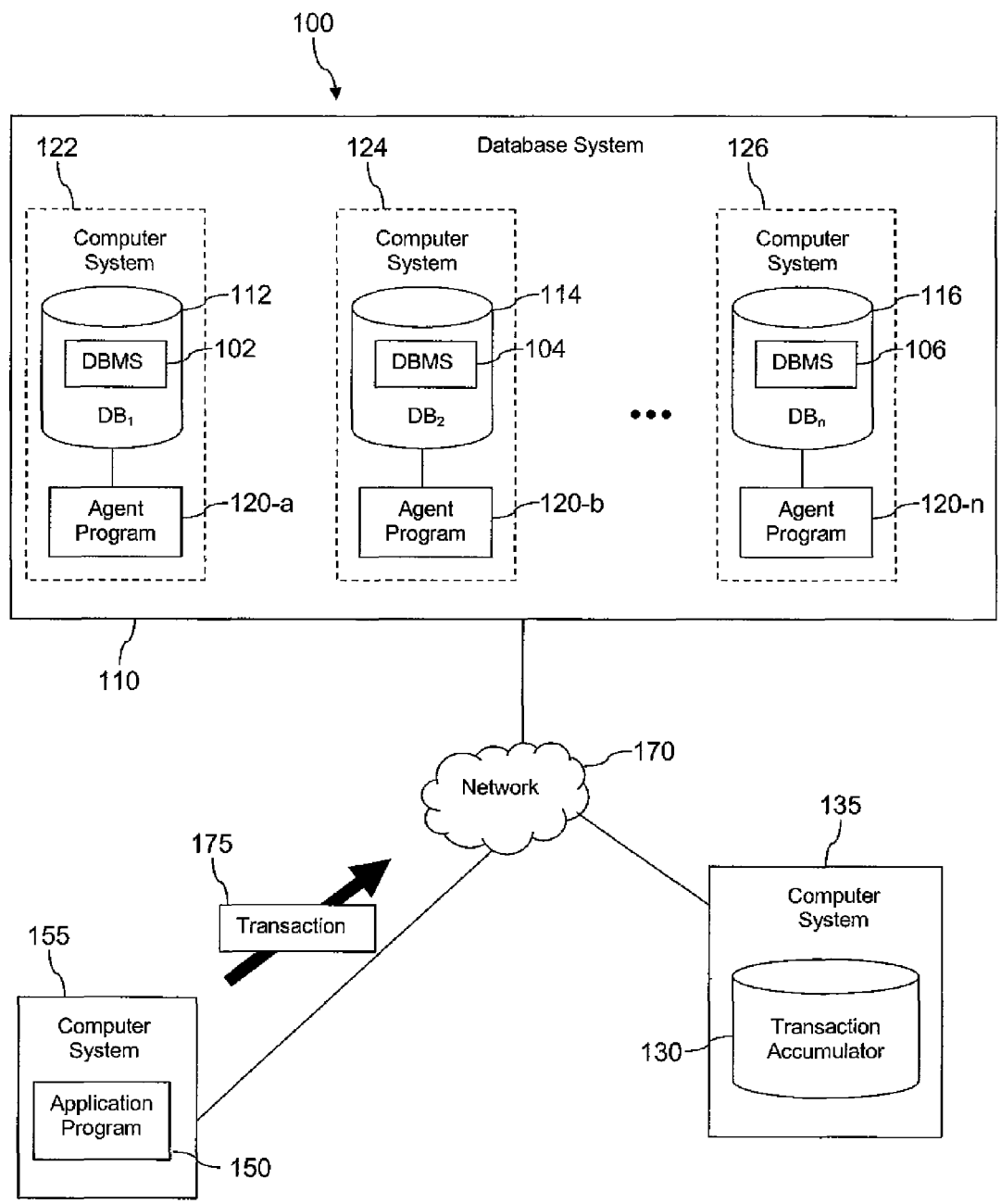
FIG. 1 shows a database recovery system in accordance with at least some embodiments.

FIG. 1 illustrates a system 100 in accordance with the at least some embodiments. In particular, system 100 comprises an application program 150, a database system 110, and a transaction accumulator 130 executed on a computer system 135. The application program 150 (e.g., flight reservation application, a telecommunications service billing application, parts inventory application, etc.) is executed on a computer system 155, and the application program 150 is communicatively coupled to the database system 110 and the transaction accumulator 130 by way of the network 170 (e.g. wireline or wireless). In order to fulfill its assigned task, the application program 150 issues a plurality of transaction statements to the database system 110, for example transaction 175. Each transaction statement comprises multiple native database commands (e.g., ANSI standard Structured Query Language (SQL) commands) that may trigger changes in the database system 110.

The database system 110 comprises one or more of computer systems that store data and make data available to the application program 150, and possibly additional computer systems executing application programs not shown in FIG. 1. In the illustration of FIG. 1, the database system 110 comprises a plurality of heterogeneous databases 112-116 executed on separate computer systems 122, 124 and 126, respectively. However, in other embodiments some or all of the databases 112, 114 and 116 may reside on the same computer system. Each of the plurality of heterogeneous databases 112-116 may implement a different database management system (DBMS) 102-106 (e.g., MySQL, Oracle, Microsoft Access, etc.).

The DBMSs 102-106 on the plurality of heterogeneous databases 112-116 receive the transaction statements issued by the application program 150 and implement the transaction statements to trigger the changes in each of the heterogeneous databases 112-116. In at least some embodiments, a transaction statement may comprise a set of native database commands that trigger a change in the database 112; a set of native database commands that trigger a change in the database 114; and a set of native database commands that trigger a change in the database 116. However, in other embodiments there may be separate transaction statements for each of the plurality of heterogeneous databases 112-116. The DBMSs 102-106 interpret the native database commands in the transaction statement and trigger the change in the respective heterogeneous databases 112-116. After the DBMSs 102-106 implement the transaction statement to trigger the changes in the plurality of heterogeneous databases 112-116, the changes triggered by the transaction statement are committed within each database. When the changes triggered by the transaction statement are committed it marks the end of a transaction statement and the changes in the plurality of heterogeneous databases 112-116 become permanent.

The discussion now turns to the various embodiments for the recovery of the plurality of heterogeneous databases 112-116 based on the information from the transaction statements. The application program 150 issues a plurality of transaction statements that trigger changes in the plurality of heterogeneous databases 112-116. Each transaction statement comprises native database commands that trigger a sequential change in the plurality of heterogeneous databases 112-116. For example, the transaction statement may: store new data in database 112; then delete data on database 116; and then update data on database 114.

As previously discussed, the DBMSs 102-106 on the plurality of heterogeneous databases 112-116 receive the transaction statement issued by the application program 150 and interpret the native database commands in the transaction statement to trigger the change in each of the heterogeneous databases 112-116. In at least some embodiments the database system 110 comprises agent programs 120a-120n that execute on respective computer systems with their database, and the agent programs 120a-120n communicate with respective database management systems 102-106. The agent programs 120a-120n capture information from the transaction statements issued by the application program 150. In particular, the agent programs 120a-120n, by communicating with the respective database management system 102-106, capture the respective set of native database commands. For example, the agent program 120a communicating with the DBMSs 102 captures the native database commands that trigger the change in database 102. In addition to the native database commands, the agent programs 120a-120n capture other information such as a database identification (e.g., database name), a username (i.e., username of the user running the application program or the name of the computer system executing the application program), a time stamp (i.e., the time when the native database commands triggered the change in the databases 112-116), and the data manipulated by the native database commands on the databases 112-116. Further, the agent programs 120a-120n capture the information from the transaction statement to determine if the changes triggered by the transaction statement committed, and the time stamp when the changes triggered by the transaction statement committed. In at least some embodiments the agent programs 120a-120n send the information from the transaction statement to the transaction accumulator 130 by way of network 170.

The transaction accumulator 130 is a computer program executed on a computer system 135 that accumulates information from the transaction statement issued by the application program 150. The transaction accumulator 130 has communications connectivity to the network 170, and the transaction accumulator 130 receives the information from the transaction statement from the agent programs 120a-120n via the network 170. In particular, the transaction accumulator 130 receives and accumulates the information from the transaction statement in the same sequence that the transaction statement triggers the change in the plurality of heterogeneous databases 112-116. The information from the transaction statement accumulated by the transaction accumulator 130 comprises information such as the native database commands, the database identification, the username, the time stamp and the data manipulated. Further, the transaction accumulator 130 accumulates time stamp information indicating when the changes triggered by the transaction statement committed. The transaction accumulator 130 accumulates the information from the transaction statement, and the transaction accumulator 130 enables recovery of the plurality of heterogeneous databases 112-116 to a point in time based on the information from the transaction statements.

In at least some embodiments, in the event that there is a failure (e.g., power failure, user error or database failure), the transaction accumulator 130 contains sufficient information to recover the plurality of the heterogeneous databases 112-116 to a particular point in time. In particular, the transaction accumulator 130 reissues the transaction statement by sending the information from the transaction statement to the plurality of heterogeneous databases 112-116. The transaction accumulator 130 sends the information from the transaction statement in the same sequence that the transaction accumulator 130 received the information from the transaction statement.

Figures 2, 3:
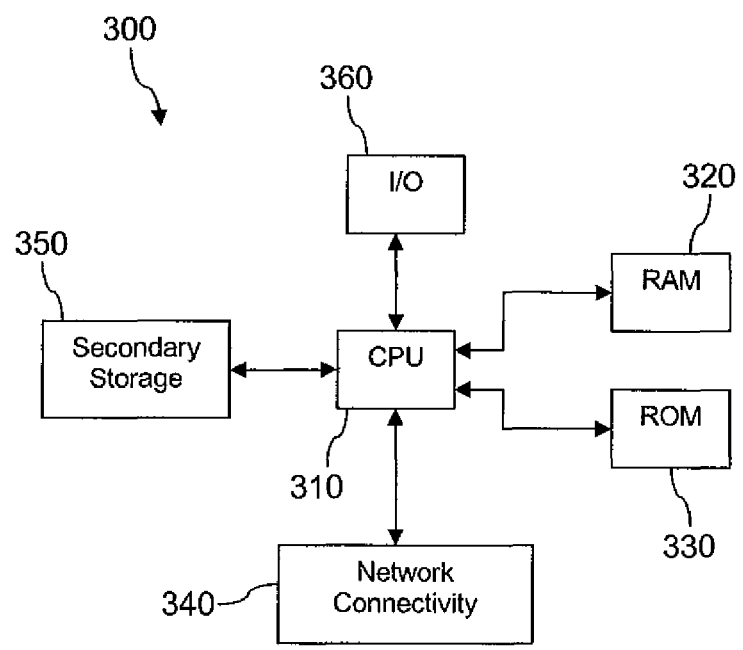
FIG. 2 shows a transaction accumulator in accordance with at least some embodiments.
FIG. 3 shows a computer system suitable for implementing the several embodiments of the disclosure.

FIG. 2 illustrates the transaction accumulator 130 to more fully explain how the transaction accumulator 130 enables recovery of the plurality of heterogeneous databases 112-116. Initially, a backup (i.e., using any available database backup tool) is created for each of the plurality of the heterogeneous databases 112-116. The backup is considered as a starting point for each of the plurality of heterogeneous databases 112-116. Stated otherwise, each of the plurality of heterogeneous databases start at the same point in time based on the backup. The transaction accumulator 130 comprises n entries 205 of information from the plurality of transaction statements accumulated since the backup of the plurality of heterogeneous databases 112-116. The entries 205 are in the same sequence that the plurality of transaction statements triggered changes in the plurality of heterogeneous databases 112-116 and each entry 205 in the transaction accumulator 130 comprises information such as database identification 210, time stamp 220, username 230, native database commands 240 and data manipulated 250. Consider, for the purpose of explanation, that a user wishes to recover the plurality of heterogeneous databases 112-116 to a point in time (e.g. Monday 2:00 PM). Based on the time stamp 220 information in the entries 205, the transaction accumulator 130 determines the entry 205 with the time stamp 220 the same as the point in time (i.e. Monday 2:00 PM). The transaction accumulator 130 sends the entries 205, starting from the first entry 205 (a complete backup) to the entry 205 with the time stamp 220 the same as the point in time, to the plurality of heterogeneous databases 112-116. The DBMSs 102-106 on the plurality of heterogeneous databases 112-116 receive the entries 205 sent by the transaction accumulator 130. The DBMSs 102-106 utilize the backup as a starting point and the information from the transaction statement comprised in the entries 205 to recover the heterogeneous databases 112-116 to the point in time.

In at least some embodiments, the transaction accumulator 130 enables a recovery of the plurality of heterogeneous databases 112-116 to a point of issue. Consider, for example, that the application program 150 issues a transaction statement that inadvertently deletes a portion or all of the data stored on one or a plurality of the heterogeneous databases 112-116. The transaction accumulator 130 sends the entries 205 that were accumulated before the application program 150 issued the transaction statement that inadvertently deleted the data. In other embodiments, the transaction accumulator 130 sends only the entries 205 comprising information from specific transaction statements. For example, the transaction accumulator 130 sends only the entries 205 comprising information from the transaction statements that updated or stored new data on the plurality of heterogeneous databases 112-116. In alternative embodiments, the transaction accumulator 130 enables a backup of the plurality of heterogeneous databases 112-116 by sending all of the entries 205 accumulated in the transaction accumulator 130 to the backups of the plurality of heterogeneous databases 112-116.

In alternative embodiments, the transaction accumulator 130 is able to "look forward" in time to ensure that the changes triggered by the transaction statements are committed. Consider, for purpose of explanation, that during recovery of the plurality of heterogeneous databases 112-116 the transaction accumulator 130 identifies that the change triggered by a transaction statement has failed to commit. Specifically, the transaction accumulator 130 does not have an entry 205 comprising a time stamp 220 of when the change triggered by the transaction statement committed. The transaction accumulator 130 "looks forward" in time (i.e., looks at the entries 205 following the failed commit) to ensure that the change triggered by the transaction statement has committed.

In alternative embodiments, the transaction accumulator 130 accumulates the information from the transaction statement based on a recovery time objective (RTO) or a recovery point objective (RPO). Recovery time objective (RTO) is a predetermined amount of time (e.g., minutes, hours, days, etc.) to allow for the recovery of the plurality of heterogeneous databases 112-116. Thus, the transaction accumulator 130 accumulates the information from the transaction statement that enables recovery of the plurality of heterogeneous databases 112-116 within the predetermined amount of time. Recovery point objective (RPO) is a predetermined amount of data allowed to be lost during the recovery of the plurality of heterogeneous databases 112-116. Stated otherwise, RPO is the point in time, prior to the time of a failure, to which the plurality of heterogeneous databases 112-116 are recovered. Thus, the transaction accumulator 130 accumulates information from the transaction statement up to the point in time based on the RPO.

Any of databases, agent programs or application programs described above may be implemented on any computer system with sufficient processing power, memory resources, and network throughput capability to handle the necessary workload placed upon it. FIG. 3 illustrates a computer system suitable for implementing one or more embodiments disclosed herein. The computer system 300 includes a processor 310 (which may be referred to as a central processor unit or CPU) that is in communication with memory devices including secondary storage 350, read only memory (ROM) 330, random access memory (RAM) 320, input/output (I/O) devices 360, and network connectivity devices 340. The processor may be implemented as one or more CPU chips.

The secondary storage 350 is comprised of one or more disk drives or tape drives and is used for non-volatile storage of data and as an over-flow data storage device if RAM 320 is not large enough to hold all working data. Secondary storage 350 may be used to store programs which are loaded into RAM 320 when such programs are selected for execution. The ROM 330 is used to store instructions and perhaps data which are read during program execution. ROM 330 is a non-volatile memory device which typically has a small memory capacity relative to the larger memory capacity of secondary storage. The RAM 320 is used to store volatile data and perhaps to store instructions. Access to both ROM 330 and RAM 320 is typically faster than to secondary storage 350.

I/O devices 360 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 340 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity devices 340 may enable the processor 310 to communicate with an Internet or one or more intranets. With such a network connection, it is contemplated that the processor 310 might receive information from the network, or might output information to the network in the course of performing the above-described method steps. Such information, which is often represented as a sequence of instructions to be executed using processor 310, may be received from and outputted to the network, for example, in the form of a computer data signal embodied in a carrier wave Such information, which may include data or instructions to be executed using processor 310 for example, may be received from and outputted to the network, for example, in the form of a computer data baseband signal or signal embodied in a carrier wave. The baseband signal or signal embodied in the carrier wave generated by the network connectivity devices 340 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 310 executes instructions, codes, computer programs, scripts which it accesses from hard disk, floppy disk, optical disk (these various disk based systems may all be considered secondary storage 350), ROM 330, RAM 320, or the network connectivity devices 340. While only one processor 310 is shown, multiple processors may be present. Thus, while instructions may be discussed as executed by a processor, the instructions may be executed simultaneously, serially, or otherwise executed by one or multiple processors.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method comprising:
capturing, by a plurality of agent programs, native database command statements from a transaction statement issued by an application program to a plurality of heterogeneous databases, the transaction statement triggers a change in the plurality of heterogeneous databases, wherein each of the plurality of agent programs captures a portion of the native database command statements from the transaction statement from one of the plurality of heterogeneous databases;
accumulating, by a transaction accumulator, the native database command statements captured by the plurality of agent programs in the same sequence that the transaction statement triggered the native database command statements to change the plurality of heterogeneous databases; and
recovering, by the transaction accumulator, the plurality of heterogeneous databases to a point in time by reissuing the native database command statements from the transaction statement to the plurality of heterogeneous databases in the same sequence that the transaction statement triggered the native database command statements to change the plurality of heterogeneous databases.

2. The method as defined in claim 1 wherein the capturing further comprises intercepting the native database command statements from the transaction statement.

3. The method as defined in claim 1 wherein the capturing by the plurality of agent programs further comprises capturing at least one of a database identification, a username, a time stamp, and data manipulated by the transaction statement.

4. The method as defined in claim 3 wherein the accumulating by the transaction accumulator further comprises the transaction accumulator accumulating the at least one of the database identification, the username, the time stamp, and the data manipulated by the transaction statement.

5. The method as defined in claim 1 wherein the reissuing the native database command statements from the transaction statement further comprises looking forward to ensure that the changes triggered by the transaction statements have committed.

6. The method as defined in claim 1 wherein the accumulating further comprises accumulating in accordance with at least one a recovery time object, and a recovery point object.

7. The method as defined in claim 1 wherein the transaction accumulator recovers the plurality of heterogeneous databases to the point in time by sending a complete backup and the native database command statements up to the point in time to the plurality of heterogeneous databases.

8. The method as defined in claim 1 further comprising recovering, by the transaction accumulator, the plurality of heterogeneous databases to a point of issue.

9. A system comprising:
a first computer system configured to execute an application program, the first computer system in operational relationship with a plurality heterogeneous databases, the application program issues a transaction statement to the plurality of heterogeneous databases that triggers a change in the plurality of heterogeneous databases, wherein the transaction statement comprises native database command statements;
a second computer system configured to comprise the plurality of heterogeneous databases, the second computer system further configured to execute agent programs, wherein each of the agent programs captures a portion of the native database command statements from the transaction statement from one of the plurality of heterogeneous databases; and
a third computer system configured to accumulate the native database command statements from the transaction statement captured by each of agent programs in the same sequence that the transaction statement triggered the native database command statements to change the plurality of heterogeneous databases, the third computer system further configured to recover the plurality of heterogeneous databases by reissuing the native database command statements from the transaction statement to the plurality of heterogeneous databases in the same sequence that the transaction statement triggered the native database command statements to change the plurality of heterogeneous databases.

10. The system as defined in claim 9 wherein the agent programs are configured to intercept the native database command statements from the transaction statement.

11. The system as defined in claim 9 wherein the third computer system is configured to further accumulate at least one of a database identification, a username, a time stamp, and data manipulated by the transaction statement.

12. The system as defined in claim 11 wherein the time stamp is a time stamp of when the change triggered by the transaction statement was committed.

13. The system as defined in claim 9 wherein the first computer system comprises one or more computers, the second computer system comprises one or more computers, and the third computer system comprises one or more computers.

14. The system as defined in claim 9 wherein the third computer system is configured to look forward to ensure that the changes triggered by the transaction statement committed.

15. The system as defined in claim 9 wherein the third computer system comprises a transaction accumulator.

16. The system as defined in claim 9 wherein the third computer system is configured to accumulate in accordance with at least one a recovery time object, and a recovery point object.

17. A computer-readable medium storing a program that, when executed by a processor, causes the processor to:

capture native database command statements from a transaction statement issued to a plurality of heterogeneous databases, the transaction statement issued by an application program to the plurality of heterogeneous databases and the transaction statement triggers a change in the plurality of heterogeneous databases; and send the native database command statements from the transaction statement to a transaction accumulator in the same sequence that the transaction statement triggered the native database command statements to change the plurality of heterogeneous databases to enable the transaction accumulator to recover the plurality of heterogeneous databases by reissuing the native database command statements to the plurality of heterogeneous databases in the same sequence that the transaction statement triggered the native database command statements to change the plurality of heterogeneous databases.

18. The computer-readable medium of claim 17 wherein when the processor captures the native database command statements from the transaction statement the program causes the processor to intercept the native database command statements from the transaction statement.

19. The computer-readable medium of claim 17 wherein when the processor sends the native database command statements from the transaction statement, the program causes the processor to send at least one of a database identification, a username, a time stamp, and data manipulated.

20. The computer-readable medium of claim 17 wherein when the processor captures the native database command statements from the transaction statement the program causes the processor to capture a time when the change triggered by the transaction statement was committed.

21. The computer-readable medium of claim 17 wherein the program causing the processor to send the native database command statements from the transaction statement to a transaction accumulator enables the transaction accumulator to recover the plurality of heterogeneous databases to a point of issue.

\* \* \* \* \*